John Gordon Baker
INVENTOR

BY George E. Szekely
ATTORNEY

April 7, 1970 J. G. BAKER 3,504,700
SWING CHECK VALVE

Filed June 9, 1966 4 Sheets-Sheet 2

John Gordon Baker
INVENTOR

BY George E. Szekely
ATTORNEY

April 7, 1970 J. G. BAKER 3,504,700
SWING CHECK VALVE
Filed June 9, 1966 4 Sheets-Sheet 4

John Gordon Baker
INVENTOR

BY George E. Szekely
ATTORNEY

United States Patent Office 3,504,700
Patented Apr. 7, 1970

3,504,700
SWING CHECK VALVE
John Gordon Baker, Evansville, Wis., assignor to Baker Manufacturing Company, Evansville, Wis., a corporation of Wisconsin
Filed June 9, 1966, Ser. No. 556,309
Int. Cl. F16k *15/03*
U.S. Cl. 137—527.4                9 Claims

ABSTRACT OF THE DISCLOSURE

The spool of a pitless well unit is provided with discharge ports at opposite sides of an inlet passage. The ports are controlled by swing valve discs. Each disc is pivoted to a parallel pair of horizontal arms, the pivot axis being in a vertical plane, diametral of the disc. Each pair of arms pivots on a vertical shaft extending between the spool flanges, the shaft carrying a tandem pair of torsion springs, each one of which bears against a lug on the corresponding arm, thus biasing the valve disc to its closed position, effecting a tight seal independently of back pressure and gravity. Suitable lug stops are provided for the purposes of limiting the angle of disc pivot relative to the arms and total swing of the disc and arm assembly.

---

This is a continuation-in-part of my prior application, Ser. No. 456,668, filed May 18, 1965, entitled Pitless Well Unit, now Patent Number 3,373,819, issued Mar. 19, 1968.

This invention relates to a swing valve and arrangement thereof particularly for use with pitless well units, but not restricted thereto. A pitless well unit of the general type for which this invention is most advantageous is fully described in my above-identified application. Units of the type there shown and described involve a spoon which, with its associated case, defines a discharge passage or chamber communicating between a pump discharge and a lateral delivery line, at or near the top of a water well casing. The valve and related structures of this invention are incorporated in, or associated with, such a spool in a manner to prevent back-flow from water storage or utilization facilities when there is no demand on the well, or when the pressure in the pump discharge line falls below the minimum pressure required for satisfactory flow to the delivery pipe.

Units of the type here contemplated are often used in association with small well casings, and in any event reasons of economy require the assemblage to be as small and compact as possible. Furthermore, provision must often be made for various appurtenances to be passed down the well, between the case or casing and the spool. For the aforesaid reasons, the space available for valves and their operation is usually rather limited, with the result that in prior art devices the valve function has involved many objectionable conditions, such as restricted or tortuous flow, turbulence, leakage, excessive wear, and the like, which have been causes of faulty or inefficient operation and excessive maintenance costs.

It is a general object of this invention to overcome or alleviate the various objections prevailing in prior valves, structures and arrangements.

It is a more specific object of this invention to provide a valve, structure and arangement which afford substantially full flow, with minimum restriction, obstruction and turbulence, under the conditions usually prevailing in pitless well structures, or the like, without unduly increasing the overall size, weight and cost of the unit or interfering with other appurtenances generally associated with such structures.

It is further, specific object of the invention to provide in a swing check valve a seating structure and arrangement whereby to minimize gasket wear, cold-flow or dislodgement.

Another object of this invention is to provide in a swing check valve a novel operating mechanism which best assures proper seating of the gasket and proper motion of the valve body to and from the seat, to minimize galling, binding, slam and other objectionable characteristics, while insuring sufficiently rapid opening and closing of the valve to obviate or minimize flow losses in the system with which the valve is used.

The foregoing and other objects and advantages of this invention will be apparent from the ensuing description, read in connection with the accompanying drawings, in which.

Figure 3:
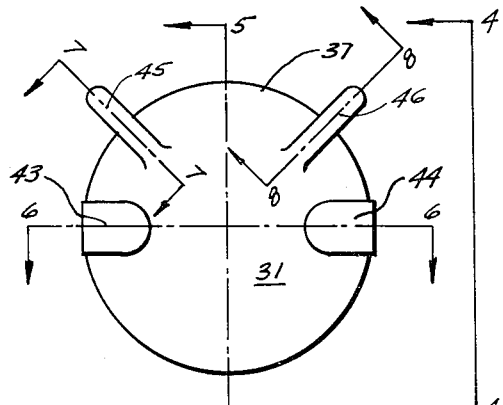
FIGURE 3 is a plan view of one of the valve discs shown in FIGS. 1 and 2.
Figure 5:
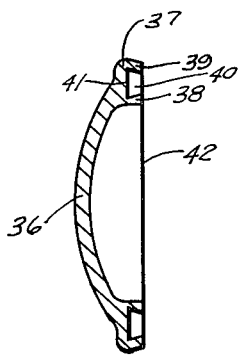
Figure 9:
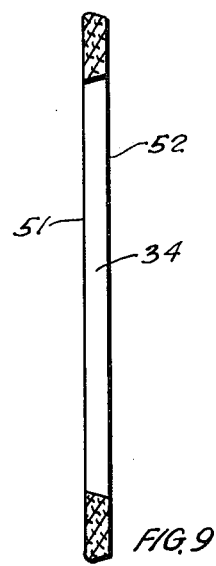
Figure 10:
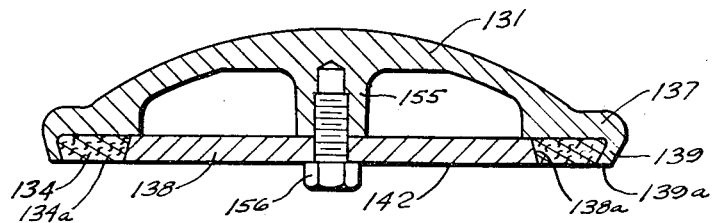
Figure 11:
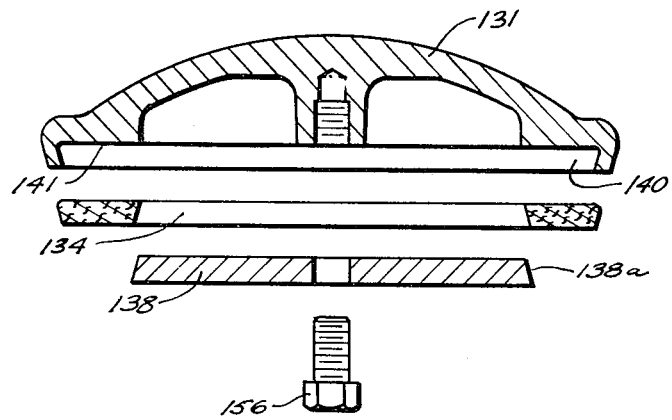
Figure 12:
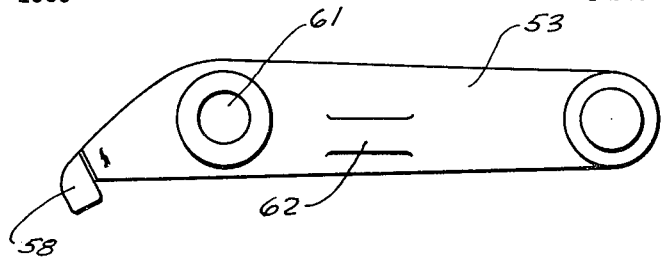
Figure 13:
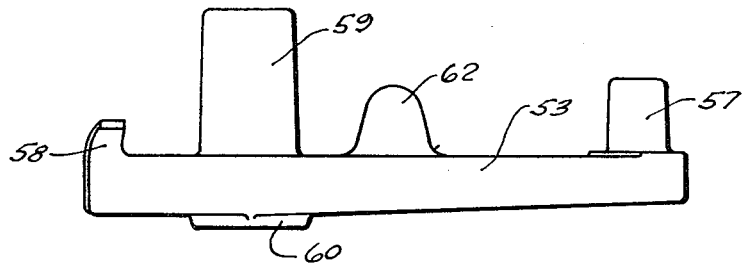
Figure 14:
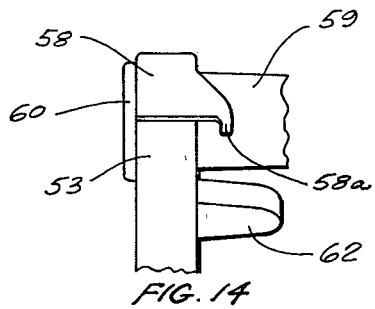
Figure 15:
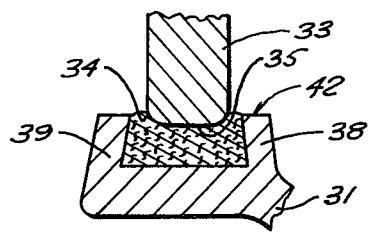

FIGURES 5, 6, 7 and 9 are sections of the valve disc taken on lines 5—5, 6—6, 7—7, and 8—8 respectively of FIG. 3;

FIGURE 9 is a section of the valve gasket;

FIGURES 10 and 11 are sectional views illustrating a modified valve disc and an alternative arrangement for retention of the gasket in the disc;

FIGURES 12, 13 and 14 illustrate details of one of the rocker arms for operation of the valve body;

FIGURE 15 is an enlarged partial cross-section of the gasket and seat.

Figures 1, 2:
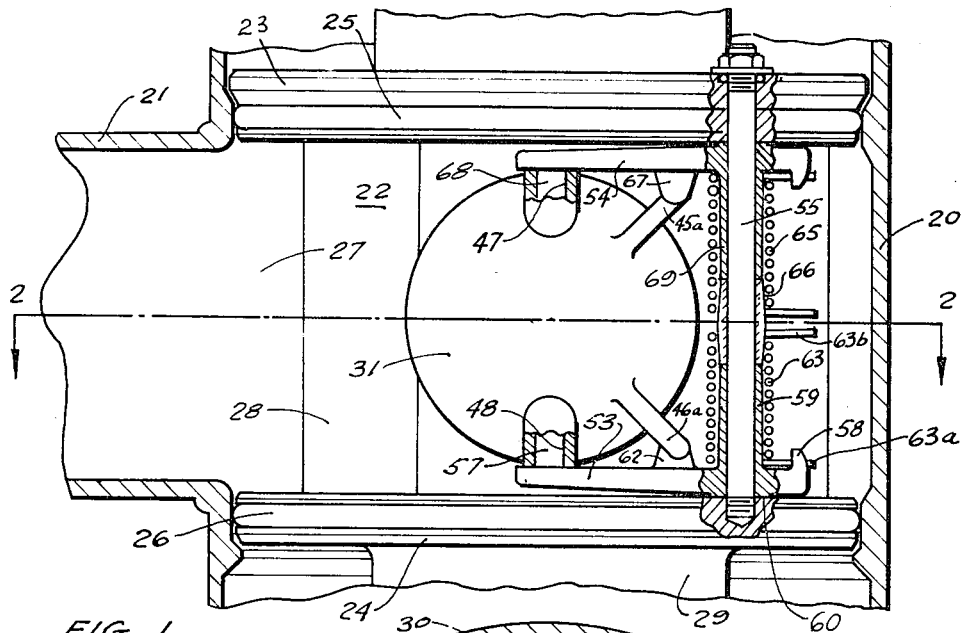
FIGURE 1 is a side elevation of a pitless well unit spool with the valve of this invention in place thereon, showing the case in section, with certain parts of the valve structure cut away to show details.
FIGURE 2 is a horizontal section through the pitless unit case and spool of FIG. 1, taken on line 2—2 of FIG. 1, showing portions of the valve structure in section and portions in plan.

Referring now to FIGS. 1 and 2, reference numeral 20 indicates a pitless unit case adapted to be mounted at the top of a water well. Case 20 has a lateral discharge spud 21. Spool 22 bridges the opening to spud 21; flanges 23 and 24, with seals 25 and 26 respectively, combine with case 20 to define a discharge space or chamber 27 in case 20, communicating with spud 21. The vertical cylindrical wall 28 defines an inlet chamber for communication with the spool inlet connection 29, through which water is received under pressure from the pump (not shown). Communication between inlet 29 and chamber 27 is controlled by the valve arrangement which is the subject of this invention.

In the preferred arrangement shown in FIGS. 1 and 2, two valves are employed, for the purpose of obtaining maximum flow at given available pressure. However, it will be understood that a single valve may be used, although, in the example illustrated, two valves best assure the maximum advantages of this invention. In the ensuing description some details of construction and opperation are given by reference to one of the valves shown, it being understood that the construction of the other valve is the same in all material respects, except of opposite hand, as referred to the direction of swing.

As seen in full lines, valve closure members 30 and 31 are in their closed positions, opposing lips 32 and 33, which latter are integral with inlet chamber wall 28, thus defining ports communicating with inlet connection 29. The closure members 30 and 31, being in this case generally of disc form, are hereinafter denominated as "discs," but it will be understood that other closure member conformations may be used, as the exigencies of particular appurtenant structures may require. Referring more specifically to the left hand disc 31, gasket 34 is carried thereby in a position to oppose and seal on ring seat 35, when in closed position.

Details of disc 31 are best seen in FIGS. 3 to 8 inclusive. Disc 31 has a dished head 36 and an annular flange 37. Lips 38 and 39 define annular recess 40, which is trapezoidal in cross-section, having base 41 inward of face flange 42. On its side opposite to recess 40, disc 31 is provided with a pair of coaxial bosses 43 and 44. Disc 31 also carries a pair of ribs 45 and 46, projecting beyond the periphery of flange 37, the ribs being angularly disposed relative to each other and to the bosses 43 and 44. Bosses 43 and 44 are on a center line of disc 31 equidistant from ribs 45 and 46.

Figure 4:
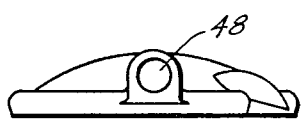
FIGURE 4 is an elevation of the valve body shown in FIG. 3, taken on line 4—4 of FIG. 3.
Figure 6:
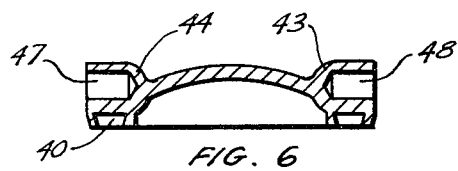
Figure 8:
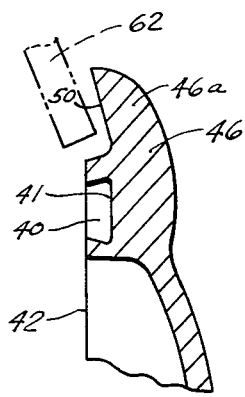
Figure 7:
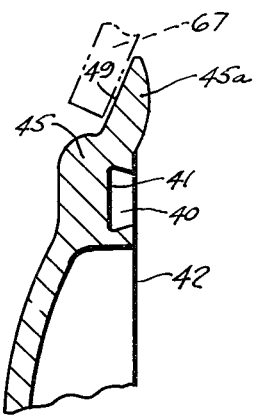

As best seen in FIGS. 4 and 6, bosses 43 and 44 are provided with sockets 47 and 48 respectively. As best seen in FIGS. 7 and 8, the projections of ribs 45 and 46 define lugs 45a and 46a respectively. Faces 49 and 50 of lugs 45a and 46a respectively are angularly disposed relative to face 42, face 49 being on the side away from face 42 and sloping outwardly theretoward, while face 50 is on the side of lug 46a toward face 42, sloping outwardly theretoward, in a plane nearly parallel to that of face 49. Gasket 34, FIG. 9, has a trapezoidal cross-section substantially the same as that of recess 40. Gasket 34 is forced into disc recess 40 with gasket face 51 against recess face 41, so that gasket 34 fills recess 40, as seen in FIG. 2. For reasons later discussed, manufacturing tolerances should be such that outer face 52 of gasket 34 in no case projects beyond body face 42.

If the gasket required for a particular application is of grade and size not readily susceptible to the necessary deformation for forcing same into groove 40, the disc and gasket may be arranged as shown in FIGS. 10 and 11, wherein parts corresponding to those previously described are correspondingly numbered with the addition of 100. In this form, disc 131 has an annular flange 137 with a reentrant lip 139, defining recess 140. Disc 131 is provided with an inner central boss 155, which is tapped to receive cap screw 156, for clamping of plate 138 against the bottom face 141 of recess 140. Edge 138a of plate 138 is of smaller diameter and reversely beveled relative to lip 139, thus defining an annulus of trapezoidal cross-section substantially corresponding to that of gasket 134, which is positioned on face 141 before assembling plate 138 to the body 131. The periphery of gasket 134 in its free condition may be somewhat smaller than the periphery of face 141, to facilitate inserting the gasket past the inturned lip edge 139a, whereafter bevel edge 138a will expand the gasket into its operative position, as plate 138 is clamped against face 141. It will be seen that the outer face 134a of gasket 134 is flush with plate face 142 and the edge 139a of lip 139, when the parts are fully assembled, the thickness of plate 138 being equal to the depth of recess 140.

Referring again to FIGS. 1 and 2, it will be seen that valve disc 31 is carried on rocker arms 53 and 54, which are pivoted about the axis of shaft 55, extending between flanges 23 and 24. The part immediately hereafter described is specifically rocker arm 53, being used at the lower left and upper right positions, direction being indicated as when facing toward the discharge from chamber 27. Arm 54, used at the upper left and lower right positions is similar to arm 53, but of opposite hand in certain respects which will become apparent as the description proceeds.

Referring now to FIGS. 12–14 inclusive, arm 53 carries a stud 57 at one end, and at the other end there is a hook lug 58, offset from the main body of arm 53 and angularly disposed relative to the principal axes of arm 53. As viewed in FIG. 13, lug 58 projects from main arm 53 in the same direction as stud 57, terminating in the hook 58a, as best seen in FIG. 14. Arm 53 also carries sleeve 59, projecting from arm 53 in the same direction and parallel to stud 57, at a position near the end at which lug 58 lies. Sleeve 59 is slightly conical, with the smaller end remote from arm 53, serving not only as draft for casting or forging the arm, but for another purpose later to be shown. A shallow boss 60 is provided directly opposite sleeve 59. Hole 61, passing completely through sleeve 59 and boss 60 is finished to a close fit on shaft 55, FIG. 1. Lug 62 is between stud 57 and sleeve 59, all projecting in the same direction from the main portion of arm 53.

The assembly and operation of the valve will now be readily apparent upon reference again to FIGS. 1 and 2. Valve disc 31 is journaled on arm stud 57, with the journal axis in a plane through the center of disc 31. Pivot shaft 55 is on a vertical axis parallel to the stud journal axis, remote therefrom in a direction away from discharge spud 21. Boss 60 provides a spot face spacing arm 53 from the adjacent flange 24 a sufficient amount to obviate interference or excessive friction therebetween, when arm 53 pivots about shaft 55. A torsion spring 63 is journaled on conical sleeve 59, coaxial with shaft 55. Spring 63 is anchored at one end by extension 63a engaging hook lug 58 of arm 53. At its other end, spring 63 is anchored by extension 63b resting against spool wall 64, the primary function of which wall is more fully described in my aforesaid prior application. Spring 63 is wound and calibrated to exert a force against lug 58 equal to one-half the amount required for predetermined closing bias of disc 31, as determined from the considerations of the pressure required to seal gasket 34 on lip 35 and to oppose the selected minimum opening pressure exerted by the fluid discharge against the inner face of disc 31.

The foregoing arrangement of arm 53 with respect to disc 31 and shaft 55 is duplicated in the arrangement of arm 54, providing the other half of the required closing bias for disc 31. Arm 54 is pivoted to disc 31 at bore 47. Closing bias is provided by spring 65, which is of the same dimensions and calibration as spring 63, except wound in opposite hand. Spacer sleeve 66, between arm sleeves 59 and 69, maintains arms 53 and 54 at the desired minimum distance from each other to obviate binding on disc 31, excessive vertical separation of the arms being prevented by flanges 23 and 24, thus insuring proper engagement with pivot bores 47 and 48 and vertical centering of disc 31 relative to seat 35.

Horizontal centering is achieved by referencing the shaft 55 at its journals in flanges 23 and 24 to the center of the ports defined by lips 32 and 33, the flanges and lips being accurately finished portions of an integral casting, forging or weldment constituting spool 22. However, it will be noted that the unique arrangement of valve gasket and seat, with gasket 34 flush with face 42, permitting substantial clearances between spool lip 33 and valve lips 38, 39, obviates the need for extremely high precision in centering valve disc 31 relative to the valve port. On the other hand, the gasket 34 being well confined in recess 40, the gasket material is not subject to excessive deformation or cold-flow pressure loss. Therefore, a relatively soft grade polymer may be used as gasket material, readily conformable under moderate force to the crown of seat 35, yet with high unit sealing pressure. The sealing relationship is best seen in the enlarged partial cross-section of FIG. 15. Any permanent set is effectively compensated by the follower action of disc 31, energized by reserve bias torque of the springs.

As previously stated, the structure and operation of valve disc 30 duplicates that for valve disc 31, except being arranged for opposite hand swing to open position. Valve 31 is biased to normally closed position by torsion springs 63 and 65, while valve 30 is biased to its normally closed position by counterpart springs. When pressure of the fluid admitted through inlet 29 produces a predetermined countertorque overcoming the torsion spring biases, valves 30 and 31 swing toward the open positions indicated in broken lines, FIG. 2. Full open position is reached upon achievement of a torque differential determined by the rate of the bias springs. However, it will be seen that the total swing angle is relatively small, the swing of valve 31 being limited by arm lug 58 striking spool wall 64, the swing of valve 30 being similarly limited by the counterpart arm lug striking wall 64. In sizes for which geometry and dynamics require or permit disc 31 to swing until it strikes case 20, shock is minimized by the pivoting of disc 31 on arms 53, 54.

Since the swing angle and corresponding contraction of the torsion springs are relatively small, the minimum opening pressure may be selected at a value quite close to optimum minimum operating pressure, without danger of excessive flutter or hunting at relatively low operating pressures. The arrangement for limited swing also permits adoption of relatively high closing and sealing bias at relatively low minimum operating pressures, whereby to assure tight closing and quick shut-off in case of delivery pressure falling below the minimum. Further, the quick closing is achieved with minimal risk of excessive slam in cases of sudden pressure drops.

Consistent spring function is facilitated by the tapering of arm sleeve 59, and by provision of the spacer bushing 66. The first coil adjacent extension 63a fits closely on the inner end of sleeve 59, centering the coil on the sleeve and establishing a spring torque arm coinciding with the distance from the axis of sleeve 59 to lug 58. At extension 63b, spring 63 is positioned coaxially of sleeve 59 by bushing 66. Coils between extensions 63a and 63b are free to contract toward the sleeve taper, but it will be seen that as coils close toward the sleeve, the torque increases, decelerating the valve disc as it swings toward open position. Conversely, the decreasing angular bias upon closing of the valve decelerates the valve as it approaches its seat. Thus, shock and slam are minimized, even upon sudden surges or drops in the line pressure determining actuation of the valve. The degree of sleeve taper and the diameter of spacer bushing 66 are such that the active coils make no contact with the sleeves or bushing, within the range of contraction required for the maximum swing opening angle. By this arrangement, while the springs are held in position by the inactive end coils, there is no hysteresis effect or other cause of erratic change in torque/angle ratio through the range of angular rotation involved. Thus, a smooth swing characteristic can be established at accurately predictable opening pressures.

While the primary swinging motion of the valve is due to pivoting of the arms about the pivot shaft 55, the pivoting of the disc on the arms, at sockets 47 and 48, has important purposes and advantages. As seen in FIG. 1, lug 62 of arm 53 lies below lug 46a of disc 31, whereas lug 67 of arm 54 lies above lug 45a. The positions of the several lugs when the valve is in closed position are best seen in FIGS. 7 and 8, wherein lugs 62 and 67 are shown in broken lines. It will be seen that in closed position of the valve, lug 67 is against or close to face 49 of lug 45a, whereas in this position of the valve there is somewhat greater clearance between lug 62 and face 50 of lug 46a.

As the valve 31 begins to open, that is, to swing in counterclockwise direction as viewed in FIG. 2, pivoting about shaft 55, the opening manifestly enlarges in the direction toward discharge spud 21, so that the stream flows in that direction along face 42 of the valve. At the same time, the center of pressure on disc 31 shifts from a point in the center plane through pivot bores 47 and 48, in a direction away from the primary pivot axis along shaft 55, thus swinging disc 31 further counterclockwise about pivot studs 57 and 68, increasing the opening angle to a value somewhat more than that defined by the angle of swinging about shaft 55. This secondary swing motion also diminishes the opening volume in the direction away from discharge spud 21, thus minimizing stream bypass and turbulence. The amount of the secondary swing opening is limited to the position at which lug 46 strikes lug 62, selected for optimal opening angle of the valve within available space. The swing limitation by lug 62 also obviates flip-flopping of the valve disc 31 and possible consequent binding on lip 33. In the full open position shown in broken lines, the opening arrangement establishes a gently curving stream flow toward discharge spud 21, friction and turbulence being further minimized by the flush gasket 34, as previously described. Also, it will be seen that not only is gasket 34 firmly restrained, but there is no gasket projection whereby forces of the stream flow might tend to dislodge the gasket. On the contrary, pressure exerted by the stream tends to hold gasket 34 even more firmly in its recess. The smooth face 42 and smooth crowned seat 35, without sharp corners or other irregularities in the flow path, minimize damage to the parts due to scouring, cavitation or the like. The same favorable conditions obtain with valve 30. A fuller discussion of the advantages of the dual valve construction shown, with particular relation to use in pitless well units, will be found in my aforesaid prior application.

In the clockwise swing of valve 31 to closed position, as gasket 34 first seats along the rearward portion of seat 35, the clockwise torque exerted on body 31 at bores 47 and 48 causes a secondary clockwise pivoting of body 31 about studs 57 and 68, in a direction toward its final seating position, minimizing slam and obviating binding, while gasket 34 finds its seat. Crowning of the seat, as previously noted, obviates damage to the gasket, which rocks smoothly into its seated position. Lug 45 striking lug 67 prevents flip-flop of the valve disc 31 in the clockwise direction and prevents binding along the forward portion of seat 35, as the valve swings closed.

The foregoing description presents a preferred form and arrangement of my novel valve as particularly designed for advantageous use in a pitless well unit.

I claim:

1. A swing valve comprising: an annular seat, a disc, an annular recess in said disc, a seal ring in said recess, coaxial sockets in said disc, rocker arms associated with said disc, said arms carrying studs pivotally engaging said sockets, first lugs carried by said disc, second lugs carried by said arms in opposition to said first lugs for limiting rotation of said disc about said studs, sleeves carried by said arms, said sleeves being parallel to said studs and remote therefrom, a shaft pivotally engaging said sleeves, and means pivotally biasing said arms about said shaft in a direction to swing said disc toward said seat.

2. A swing valve according to claim 1, wherein said first lugs constitute a first spaced pair equidistant from the axis of said sockets and said second lugs constitute a second spaced pair equidistant from said studs, a first one of said first pair opposing a first one of said second pair to limit pivoting of said disc about said studs in one direction, a second one of said first pair opposing a second one of said second pair to limit pivoting of said disc about said studs in the direction opposite to said one direction.

3. A swing valve according to claim 2, wherein pivoting of said disc on said studs in said one direction increases the opening angle of said disc relative to said seat along a segment away from said shaft.

4. A swing valve according to claim 1, including means limiting the pivoting of said arms on said shaft to a predetermined angle relative to said seat.

5. A swing valve according to claim 4, wherein pivoting of said disc on said studs varies the angle of said disc relative to said seat from an angle predetermined by pivoting of said arms on said shaft.

6. A swing valve according to claim 1, wherein said bias means are torsion springs journaled on said sleeves.

7. A swing valve according to claim 6, wherein said torsion springs are anchored against rotation in one direction by said arms and against rotation in the other direction by stop means.

8. A swing valve according to claim 7, wherein third lugs on said arms oppose said stop means, portions of said third lugs engaging said springs.

9. A swing valve according to claim 7, wherein said sleeves are conical, the large ends of said sleeves being adjacent said arms, the end coils of said springs adjacent said arms fitting closely upon said sleeves, said tapers being such that active coils of said springs contract without contact upon said sleeves within the normal swing of said disc.

References Cited

UNITED STATES PATENTS

| | | | |
|---|---|---|---|
| 1,485,031 | 2/1924 | Hoffman | 251—298 |
| 2,280,757 | 4/1942 | Smith | 137—527.4 |
| 2,833,513 | 5/1958 | Castera | 251—298 |
| 3,395,727 | 8/1968 | Weise | 137—527.4 |

FOREIGN PATENTS 1,119,227  4/1956  France.

WILLIAM F. O'DEA, Primary Examiner

H. M. COHN, Assistant Examiner

U.S. Cl. X.R.

251—303